Nov. 18, 1958 H. H. MUELLER 2,860,880

TONE ARM VERTICAL COMPENSATING MECHANISM FOR AUTOMATIC INTERLOCKING DUAL PHONOGRAPH RECORD PLAYERS

Original Filed July 1, 1952 3 Sheets-Sheet 1

Herman H. Mueller
INVENTOR.

BY Clarence A. O'Brien
and Harvey B. Jacobson
Attorneys

Herman H. Mueller
INVENTOR.
BY Clarence A. O'Brien
and Harvey B. Jacobson
Attorneys Herman H. Mueller
INVENTOR.

BY Clarence A. O'Brien
and Harvey B. Jacobson
Attorneys

United States Patent Office 2,860,880 Patented Nov. 18, 1958

2,860,880

TONE ARM VERTICAL COMPENSATING MECHANISM FOR AUTOMATIC INTERLOCKING DUAL PHONOGRAPH RECORD PLAYERS

Herman H. Mueller, Ephrata, Pa., assignor of small interests to various assignees Original application July 1, 1952, Serial No. 296,558, now Patent No. 2,809,841, dated October 15, 1957. Divided and this application May 25, 1956, Serial No. 598,973

22 Claims. (Cl. 274—10)

This invention comprises novel and useful improvements in a tone arm and control mechanism for automatic interlocking dual phonograph record players and comprises division of my prior application Serial No. 296,558, filed July 1, 1952, now Patent No. 2,809,841 of October 15, 1957, and which in turn is a continuation-in-part of my prior application Serial No. 98,048, filed June 9, 1949 for Automatic Interlocking Dual Phonograph Record Player, now Patent No. 2,729,455 of January 3, 1956.

The primary and fundamental object of this invention is to provide an apparatus capable of automatically playing successively both the top and underside of each one of a stack of records in a sequential manner, while maintaining the records, at all times, in horizontally disposed positions.

A further important basic purpose is to provide an apparatus for playing a stack of records whereby each record may be played upon its top and bottom surfaces in succession and the entire stack is played automatically in sequence; or whereby only the top surfaces of the stack of records may be played automatically in sequence; or whereby a single record may be played manually; or whereby any portion of a stack may be played automatically in sequence.

Yet another and very important object of the invention is to provide an apparatus which shall be capable of handling and playing a stack of records, in a manner whereby scratching, attrition, excessive wearing or distortion of the sound track, and breakage or mutilation of the records is avoided.

An additional object of this invention is to provide an improved tone arm construction specifically adapted for the efficacious playing of a record, while the latter remains at all times in a horizontal position, upon both its top and bottom surfaces in succession.

Another object is to provide a tone arm construction having an improved stylus assembly adapted for playing successively both the top and bottom surfaces of records in the horizontal position and of records of either the conventional or the microgroove type.

A further object is to provide a tone arm construction which will automatically compensate for the variations in vertical distance from the turntable of the record being played by virtue of the accumulation of played records resting upon the turntable.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a top plan view of an automatic phonographic apparatus constructed in accordance with the principles of this invention, parts being broken away and alternative positions of certain parts being indicated in dotted lines therein;

Figure 2 is a side elevational view of the embodiment of Figure 1, a part of the casing or cabinet being broken away along a vertical plane and shown in section, to thereby expose the interior of the cabinet and certain of the operating mechanisms therein, the drawing illustrating a record resting upon the turntable with the tone arm positioned for playing the top surface of the same and showing a second record in position for the tone arm to play its bottom surface;

Referring now more particularly to the accompanying drawings wherein similar numerals designate like parts throughout the various views, it will be noted that the same numerals are employed as those used for designating the corresponding parts in my above-identified patents.

Figures 1, 4:
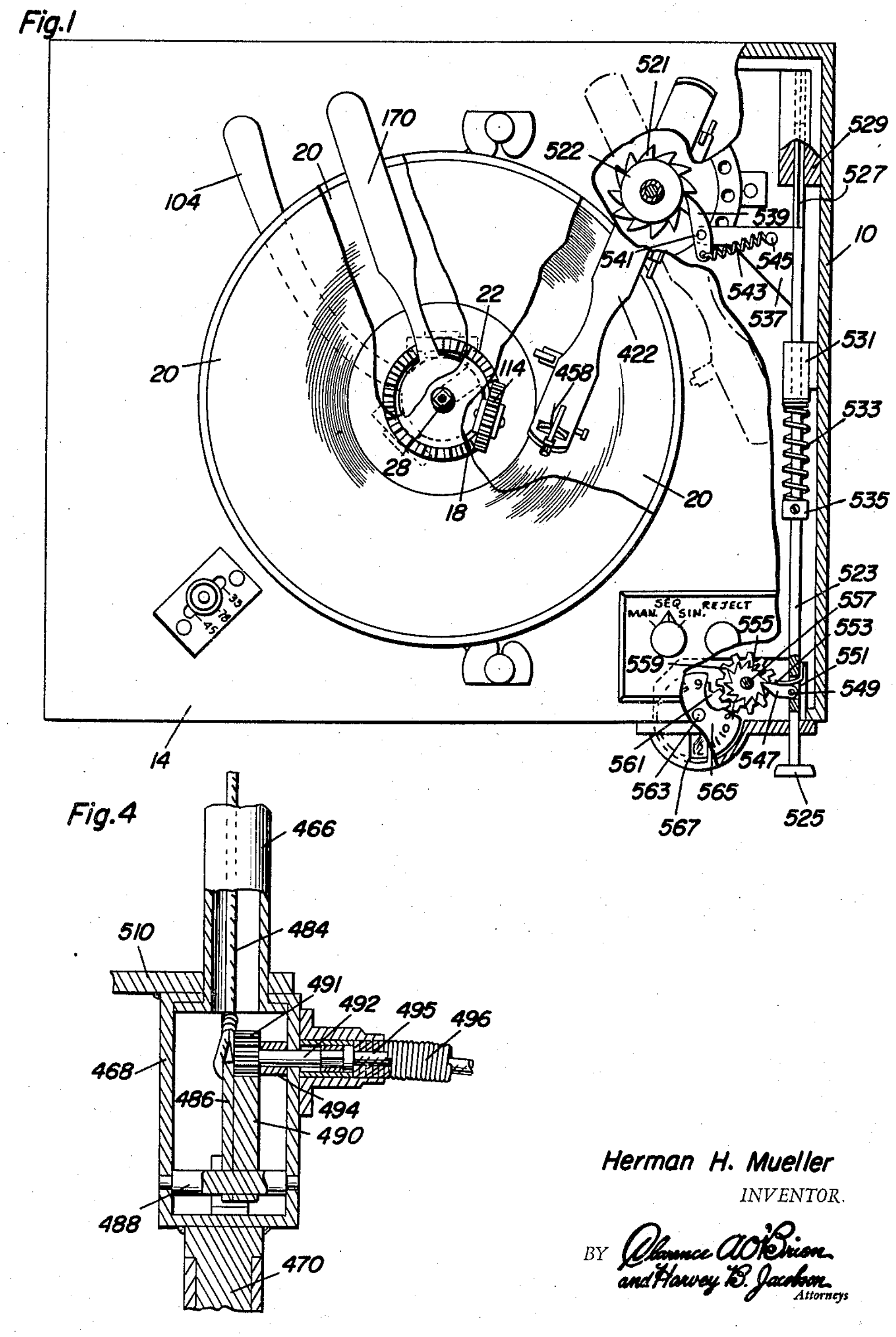
Figure 4 is a vertical sectional detail view taken substantially upon the plane indicated by the section line 4—4 of Figure 3, upon an enlarged scale.
Figure 2:
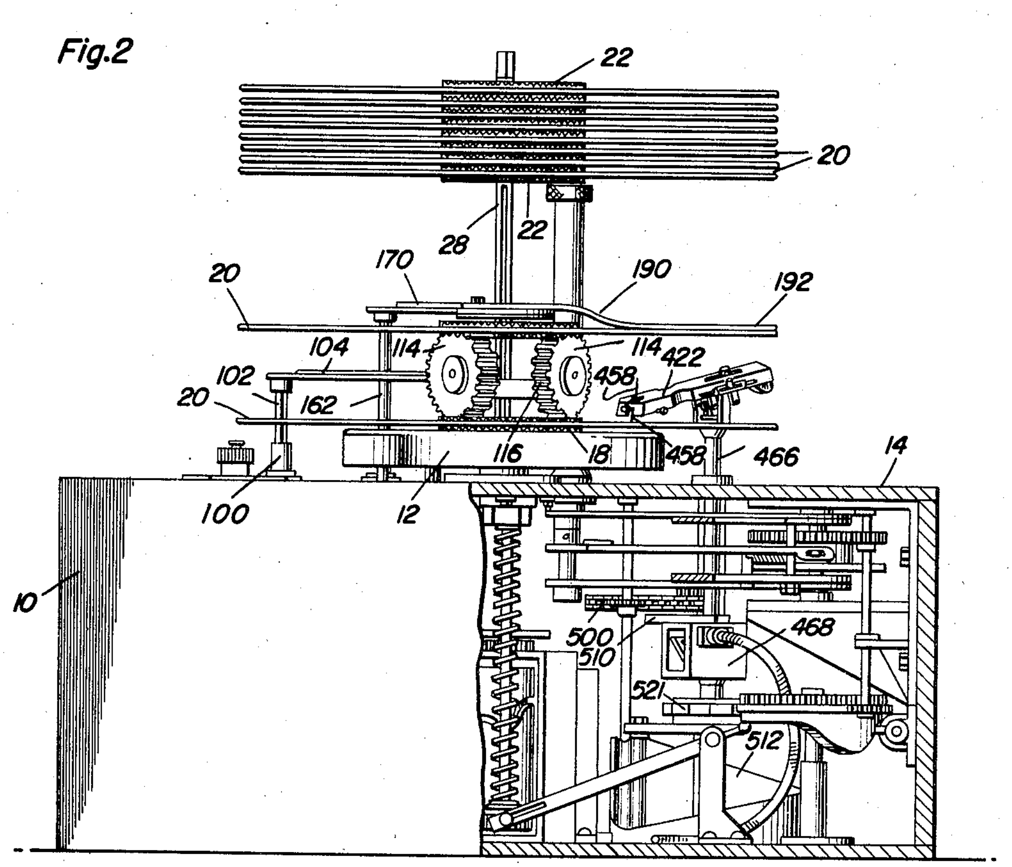
Figure 5:
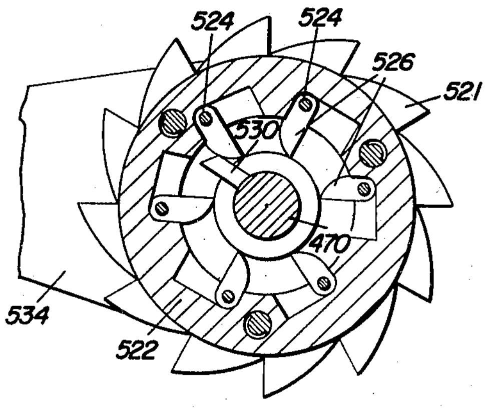
Figure 5 is a horizontal sectional detail view taken upon an enlarged scale substantially upon the plane indicated by the section line 5—5 of Figure 3 and showing particularly the means for synchronizing horizontal and vertical movement of the tone arm; and, Figure 6 is a vertical sectional detail view taken substantially upon the plane indicated by the section line 6—6 of Figure 3.
Figure 3:
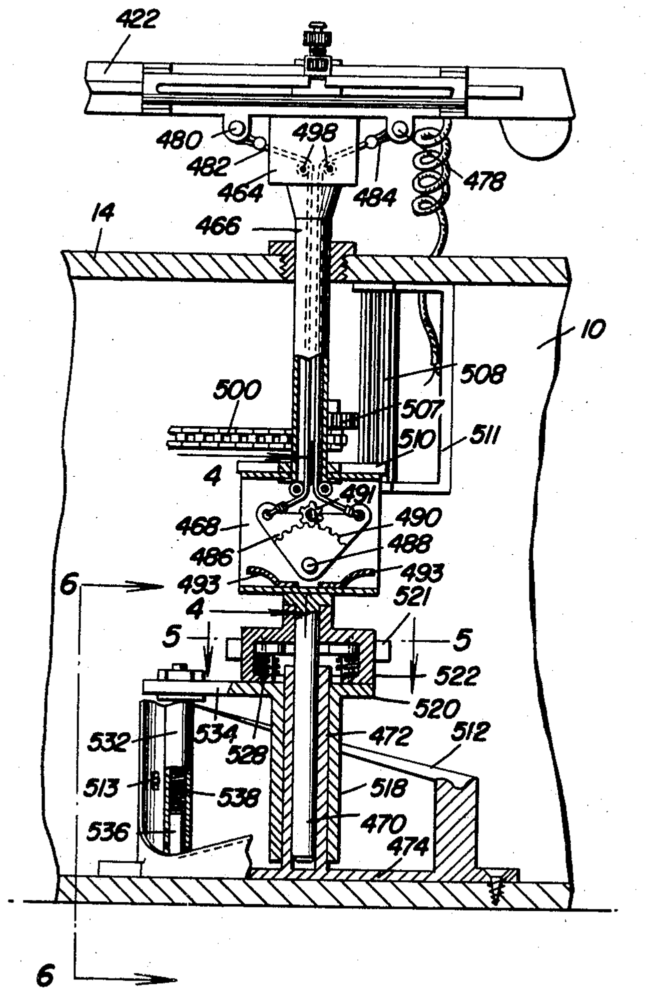
Figure 3 is a fragmentary vertical sectional view through a portion of the apparatus, showing in side elevation a portion of the tone arm and control apparatus therefor, parts being shown in section and parts being broken away.

As shown in Figures 1–3, a casing or cabinet 10 of any desired or suitable construction is provided for housing the operating mechanism, a turntable 12 being rotatably mounted upon the top 14 of the casing. This turntable may be of a conventional design if desired, but preferably is one of the improved mounting and driving constructions set forth in my co-pending application Serial No. 296,382 for Turntable and Drive for Automatic Interlocking Dual Phonograph Record Player, filed June 30, 1952, now Patent No. 2,809,843 of October 15, 1957 and which constitutes a continuation-in-part of my prior application Serial No. 98,048, filed June 9, 1949 for Automatic Interlocking Dual Phonograph Record Player and which has now matured into Patent No. 2,729,455 on January 3, 1956. The turntable includes an annular undulated interlocking clutch or non-slipping driving surface 18, see Figure 1, which serves to impart rotation to the records as set forth hereinafter, the records being indicated by the numeral 20, each record having either integral or detachable annular raised surfaces 22 upon their top and undersides, in concentric relationship to the center opening and within the sound track of the record, these surfaces being complementary to each other and to the driving surface 18 for non-slipping, interlocking engagement, as set forth in my above-identified co-pending applications.

A hollow spindle 28 is mounted upon and extends upwardly from the top 14 of the casing and is provided with suitable mechanism, not shown, for receiving a record released from the stack of records at the top of the spindle, for lowering this record upon or lifting the record from the record supporting, spacing and driving means referred to hereinafter, and for lowering this record down upon the turntable or the stack of records received upon the turntable, such mechanism being fully set forth in detail in my prior Patent No. 2,729,455.

The record driving, supporting and spacing means as shown more particularly in Figure 2, consists of an arm 104 which is rigidly and fixedly secured to and extends laterally from the upper end of a non-circular shaft 102 which is slidably disposed within a tubular locking sleeve structure 100. The shaft 102 is given a vertical motion, to raise or lower the arm 104, while the sleeve 100 is given a timed oscillatory motion whereby the shaft and arm 104 are caused to swing or oscillate in a horizontal plane. These motions, incidentally, are imparted to the sleeve 100 of the shaft 102 by a mechanism forming no part of the present invention claimed in this application, but set forth in detail in my prior Patent No. 2,729,455.

At its extremity remote from the shaft 102, the arm 104 has journaled thereon a plurality of supporting and driving rollers 114, three such rollers being generally found to be satisfactory for the purposes of this invention, these rollers having gear or toothed peripheries 116 which are complementary to and mesh with the driving surface 18 of the turntable, or the bottom and top driving surface 22 of a record 20 when the latter is supported by the rollers or is disposed upon the turntable.

There is further provided a pressure arm 170 which is adapted to exert pressure upon the record directly resting upon the supporting and driving rollers 114 to hold the record in positive, firm and non-slipping engagement with those rollers as well as to hold the rollers pressed against either the driving tracks 18 or 22 to prevent any possibility of slippage between the rotating turntable 12 and the rollers or a record resting thereon and the record which is being supported and driven by the rollers.

The pressure arm 170, which preferably is of a spring steel construction, is secured to the upper end of the shaft 162 and is moved vertically by that shaft into contact with the record 20 resting upon the rollers 114, or to elevate the pressure arm to release and disengage the same from the record. As set forth in my above identified patent, suitable antifriction means such as ball bearings or the like may be carried by the pressure arm 170 for resting upon the record, and this contact of the pressure arm with the record is disposed at the central portion of the record and within the sound track thereon. The pressure arm further has an elongated arm having a downwardly and outwardly curving portion 190, used only for large records, terminating in a flat extremity 192 which may be provided with a felt covering upon its lower surface, this covering being adapted to ride upon the sound track upon the upper side of large records which are being supported by the rollers 114 when the underside of the record is being played, so as to retain the record in a true horizontal plane as the tone arm with its needle presses upwardly against the underside of the record. The operating mechanism for actuating the pressure arm, together with the construction of the same is fully set forth and claimed in my patent above-identified.

A tone arm 422 is provided with a pair of upwardly and downwardly projecting needles 458 for selectively playing the underside and top side of records supported respectively upon the supporting and driving rollers 114 or the turntable 12 as will be apparent from Figure 2. The construction of the needle assembly forms no part of the invention claimed herein, being disclosed and claimed in my copending application now matured into Patent No. 2,809,842 of October 15, 1957.

The present invention is, however, particularly concerned with the construction and control means for operating a tone arm in an apparatus of this character whereby the sound tracks on the top and bottom sides of records while in their horizontal position may be successively played, the tone arm being thus given a vertical pivoting movement for sequentially engaging the top and bottom sound tracks of records; a horizontal swinging movement so that the needle may follow the sound track from the periphery of the record towards the center of the same; and a further horizontal swinging movement to enable the tone arm to be withdrawn from the records as the latter are fed from the stack to the record supporting and driving rollers, and from the latter to the turntable.

The tone arm is rotatably pivoted for horizontal and vertical swinging movement, so that the tone arm is swung inwardly and outwardly in a horizontal plane and upwardly and downwardly in a vertical plane.

Attention is now directed to Figures 3–6, wherein the supporting and operating means for the tone arm is illustrated. A U-shaped supporting member 464 is integrally formed or rigidly secured on the upper end of a hollow shaft 466 and an enlarged housing 468 is interposed in the shaft, with the shaft terminating at its lower end in a solid extremity 470. The end 470 is rotatably disposed in a tubular post 472, which extends upwardly from a base plate 474 secured on the bottom of the casing. The tone arm is pivotally secured to the opposing sides of the member 464. A pair of longitudinally spaced transversely extending rods 478 and 480 are carried by the tone arm and a pair of flexible operating members 482 and 484 are secured on the rods.

The opposing ends of the operating members 482 and 484 are secured to the ends of a triangular control plate 486 which is pivoted at its apex on a shaft 488 journaled in the housing 468. A segmental gear 490 is integrally formed or rigidly secured on one side of the plate and meshes with a gear 491 mounted on a shaft 492 and spaced from one side of the housing by the sleeve 494. Resilient stops 493 are provided within the housing 468 on the bottom wall thereof for limiting pivotal movement of the plate 486.

The shaft 492 is connected to a flexible operating rod 495 which is protectively disposed in a tubing 496 the operating rod and tubing being connected to the driving mechanism of the device in any suitable manner, not shown.

Thus, as the segment 490 is oscillated in a vertical plane by the gear 491, the operating members 482 and 484 are correspondingly moved upwardly and downwardly, the operating members passing through the tubular post 466 connecting the members 468 and 464 and moving over guide members 498 disposed in a support member 464. Thus, the selective tilting of the plate 486 serves to selectively position either the upwardly or downwardly extending needle into engagement with the underside or the top side of a pair of records engaged by the supporting wheels 114.

A chain drive 500 is operatively disposed between a gear box and timer constituting a source of power, not shown, and by any suitable gearing drives the gear 507 which meshes with a spline shaft 508 which is vertically journaled in a U-shaped supporting bracket 511 extending downwardly from the top 14 of the casing. A gear segment 510 is integrally formed of the shaft 466 and is oscillated by the splined shaft 508, so that oscillations of the shaft 508 in selective clockwise and counter-clockwise rotative paths, due to the forward and reverse drive of the chain transmission mechanism, oscillates the segment 510 and swings the tone arm in a horizontal plane inwardly and outwardly to the spindle.

Figure 6:
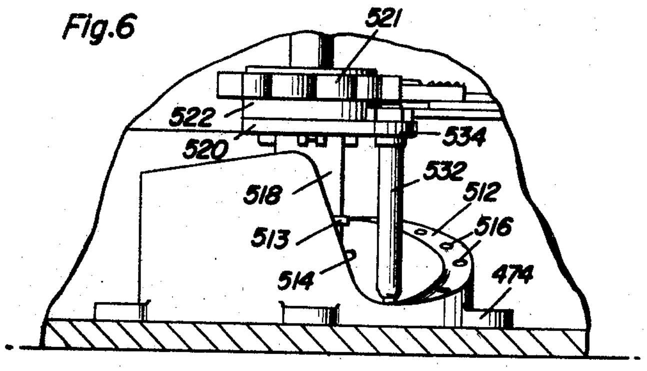

An elevated cam track 512, see Figures 3 and 6, extends gradually upwardly in a spiral path from the base 474 to define a rising trackway which terminates in an abrupt downwardly inclined return path 514. A series of spaced recesses 516 are formed along the cam track. A sleeve 518 is slidably and rotatably disposed concentrically about the sleeve 472 and terminates at its upper end in a lateral flange 520 which forms a closure plate for a housing 522, the housing being disposed about the upper end of the shaft 470 and below the housing 468.

A plurality of vertical pins 524 are disposed in the housing 522 and support at their upper ends ratchets 526, springs 528 embracing the pins and permitting movement of the ratchets in one direction only. A finger 530 extends laterally from the shaft 470 and is adapted to strike against one of the teeth 526 and rotate the sleeve 518 about the sleeve 472. The finger 530 rotates with the shaft 470, so that each time the shaft is oscillated outwardly, the finger in contact with one of the teeth moves the sleeve 518.

A tubular member 532 extends downwardly from the lateral arm 534 of the flange 520 on the sleeve 518. A pin 536 with a rounded end or ball for easy sliding over the tracks 512 is urged by a spring 538 downwardly from the tubular member 532 and defines a cam follower slidably engageable along the cam track. The spring urges the follower pin into the recesses as the arm is moved about the cam track. It is therefore obvious that the entire assembly supporting the tone arm is progressively moved upwardly corresponding with the progressive upward movement of the arms 104 and 170 to allow the records to become stacked on the turntable.

A switch actuating finger 513, see Figures 3 and 6, is movably positioned upon the abrupt return slope 514 of the cam 512 whereby the finger will be actuated by the tubular member 532 during the latter's descent down the slope after all of the records of a stack have been played. The finger 413 is connected to a switch of any desired construction, not shown, whereby the electric current energizing the record player will be automatically cut off when all of the records have been played, and the tubular member 532 is returning to its original or idle position in readiness for the next operation of the record player.

In the mechanism as so far described, the apparatus will automatically play an entire stack of records. The usual reject mechanism of course discards or rejects any particular record about to be played. It is frequently desirable, however, to discard a number of the bottom records of a stack and begin the automatic playing of the top portion of a stack of records. This requires the proper vertical positioning of the tone arm support shaft 466 and the proper rotational positioning of the tubular member 532 upon the corresponding portion of the track 512. For their purpose, an additional mechanism, shown in Figures 1–3, 5, 6 is provided.

Fixedly secured to the housing 522 is an external ring gear or ratchet wheel 521. An actuating push rod 523, having a control knob 525 is slidably journaled in the casing 10, having a non-circular portion 527 non-rotatably received in a guide 529. A further guide 531 is provided and a compression spring 533 surrounds the push rod having its ends abutting the guide 531 and an adjustable collar or spring retainer 535 secured to the push rod, for urging the push rod outwardly of the casing.

Integrally or rigidly secured to the push rod is a laterally extending lug 537 having a ratchet pawl 539 pivoted thereto at 541. A tension spring 543 has its ends secured to the pawl 539 and to an anchor pin 545 on the lug 537 to yieldingly urge the pawl into engagement with the ratchet 521.

It will now be apparent that each time the control push rod 523 is reciprocated longitudinally the ratchet and pawl will effect an oscillation or horizontally swinging movement of the housing 522, the tone arm remaining unmoved by reason of the yielding of the ratchet fingers 526 upon the lug 530. However, the oscillation of the housing 522 will cause rotative movement of the tubular member 532 upon the cam track, thus vertically lifting the tone arm. Each reciprocation of the push rod will thus advance the member 532 one station up the cam track 512 and will elevate the tone arm shaft 466 by the thickness of one record. Thus the tone arm will be lifted the appropriate distance necessitated by the increase in height of the rejected records discarded from the stack and lowered to the turntable.

An indicating device is provided which is interconnected with the push rod to indicate the member of the record discarded and the station position of the member 532 on the track 512. This indicator includes a pawl 547, pivoted at 549 in a slot or notch 551 in the push rod 523. A spring 553 yieldingly urges the pawl in one direction about its pivot.

The pawl 547 operatively engages a ratchet wheel 555 secured to a shaft 557 having a gear 559 which meshes with gear 561 on shaft 563. The latter has an indicia plate 565 whose indicia are sequentially exhibited during rotation at an inspection window 567. By this arrangement visual inclination is afforded as to the setting of this mechanism.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A tone arm assembly and actuating mechanism for phonograph record players comprising a tone arm, a needle assembly mounted upon said tone arm and having upwardly and downwardly projecting needles, a fulcrum support for said tone arm, a pivotal connection securing said tone arm to said fulcrum support for tilting about a horizontal axis, a column supporting at its upper end said fulcrum support, means within said column and connected to said tone arm on opposite sides of said pivotal connection for positively and alternatively tilting said tone arm in opposite directions about a horizontal axis between upward and downward inclined playing positions of said tone arm.

2. The combination of claim 1 wherein said means includes flexible members.

3. A tone arm assembly and actuating mechanism for phonograph record players comprising a tone arm, a needle assembly mounted upon said tone arm, a fulcrum support for said tone arm, a pivotal connection securing said tone arm to said fulcrum support for tilting about a horizontal axis, a column supporting at its upper end said fulcrum support, means within said column and connected to said tone arm for causing positive tilting of said tone arm in opposite directions about a horizontal axis, a housing at the lower end of said column supporting the latter, a plate pivotally mounted in said housing for movement about a horizontal axis, said last mentioned means being connected to said plate on opposite sides of said horizontal axis, drive means causing oscillatory movement of said plate.

4. The combination of claim 3 including drive means causing oscillatory movement of said plate, said drive means including a segmental gear on said plate and a driving pinion extending into said housing and engaging said segmental gear.

5. A tone arm assembly for phonograph record players comprising a tone arm, a needle assembly mounted on said tone arm, a fulcrum support for said tone arm, a pivotal connection securing the intermediate portion of said tone arm to said fulcrum support, an adjustable balancing assembly secured to said tone arm at one side thereof for adjustably shifting the center of gravity of the tone arm assembly longitudinally of said tone arm, means including an adjustable pressure assembly for applying a constant pressure to the engagement of the needle assembly with a record when the tone arm is tilted in either direction from its horizontal positions, said pressure assembly including a supporting member, a weight movably carried thereby, means for pivotally mounting said supporting member upon said tone arm for tilting movement, said last mentioned means comprising a U-shaped bracket having a stem extending above the web portion for supporting the bracket from the tone arm, said supporting member comprising an elongated casing having its mid-portion received between and pivoted to the legs of said bracket means for lifting said column in a step by step movement for adjusting the vertical position of the tone arm relative to an accumulating stack of records on a phonograph turntable.

6. A tone arm assembly for phonograph record players comprising a tone arm, a needle assembly mounted on said tone arm, a fulcrum support for said tone arm, a pivotal connection securing the intermediate portion of said tone arm to said fulcrum support, an adjustable balancing assembly secured to said tone arm at one side thereof for adjustably shifting the center of gravity of the tone arm assembly longitudinally of said tone arm, means including an adjustable pressure assembly for applying a constant pressure to the engagement of the needle assembly with a record when the tone arm is tilted in either direction from its horizontal positions, said pressure assembly including a supporting member, a weight movably carried thereby, means for pivotally mounting said supporting member upon said tone arm for tilting movement, said last mentioned means comprising a U-shaped bracket having a stem extending above the web portion for supporting the bracket from the tone arm, said supporting member comprising an elongated casing having its mid-portion received between and pivoted to the legs of said bracket, means for lifting said column in a step by step movement for adjusting the vertical position of the tone arm relative to an accumulating stack of records on a phonograph turntable, and for automatically returning the column and tone arm to their lowermost vertical position after they have attained their uppermost vertical position.

7. A tone arm assembly and actuating mechanism for phonograph record players comprising a tone arm, a needle assembly mounted upon said tone arm, a fulcrum support for said tone arm, a pivotal connection securing said tone arm to said fulcrum support for tilting about a horizontal axis, a column supporting at its upper end said fulcrum support, means for selectively tilting said tone arm about a horizontal axis and means for oscillating said column and tone arm about a vertical axis, means responsive to actuation of said last means for lifting said column in a step by step vertical movement for adjusting the vertical position of the tone arm relative to an accumulating stack of records on a phonograph turntable, said lifting means comprising a circular horizontally inclined cam track, a member extending laterally from and supporting said column and movable upon said cam track, means responsive to rotation of said column in one direction only for causing step by step travel of said member over said track.

8. The combination of claim 7 wherein said last mentioned means comprises a one-way clutch operatively interposed between said member and said column.

9. The combination of claim 7 including yieldable fastening means resiliently connecting said member and track for releasably securing the former at predetermined spaced positions upon the latter.

10. A tone arm assembly and actuating mechanism for phonograph record players comprising a tone arm, a needle assembly mounted upon said tone arm and including needles projecting upwardly and downwardly from the tone arm for respectively playing the top and bottom sides of records in alternation, a fulcrum support for said tone arm, a pivotal connection securing said tone arm to said fulcrum support for tilting alternatively upwardly and downwardly about a horizontal axis, a column supporting at its upper end said fulcrum support, means for lifting said column in a step by step movement for adjusting the vertical position of the tone arm relative to an accumulating stack of records on a phonograph turntable by successive vertical steps, manually operable means for positioning said column and tone arm at selected intermediate vertical positions and operable independently of said lift means.

11. A tone arm assembly and actuating mechanism for phonograph record players comprising a tone arm, a needle assembly mounted upon said tone arm and including needles projecting upwardly and downwardly from the tone arm for respectively playing the top and bottom sides of records in alternation, a fulcrum support for said tone arm, a pivotal connection securing said tone arm to said fulcrum support for tilting alternatively upwardly and downwardly about a horizontal axis, a column supporting at its upper end said fulcrum support, means for selectively tilting said tone arm about a horizontal axis and means for oscillating said column and tone arm about a vertical axis, means responsive to turning in one direction only of said column and tone arm by said last means for lifting said column in a step by step movement for adjusting the vertical position of the tone arm relative to an accumulating stack of records on a phonograph turntable by successive steps manually operable means, for positioning said column and tone arm at selected intermediate vertical positions and operable independently of said lift means.

12. The combination of claim 10 including an indicator connected to said manually operable means for designating the position of vertical adjustment of the tone arm.

13. The combination of claim 11 including an indicator connected to said manually operable means for designating the position of vertical adjustment of the tone arm.

14. A tone arm assembly and actuating mechanism for phonograph record players comprising a tone arm, a needle assembly mounted upon said tone arm and including needles projecting upwardly and downwardly from the tone arm for respectively playing the top and bottom sides only of records in alternation, a fulcrum support for said tone arm, a pivotal connection securing said tone arm to said fulcrum support for tilting alternatively upwardly and downwardly about a horizontal axis, a column supporting at its upper end said fulcrum support, means for selectively tilting said tone arm about a horizontal axis and means for oscillating said column and tone arm about a vertical axis, means responsive to turning in one direction only of said column and tone arm by said last means for lifting said column in a step by step movement for adjusting the vertical position of the tone arm relative to an accumulating stack of records on a phonograph turntable by successive steps, said lifting means comprising a circular cam track, a member projecting laterally from and supporting said column and movable upon said cam track, means responsive to rotation of said column in one direction for causing step by step travel of said member over said track, manually operable means for positioning said column and tone arm at selected intermediate vertical positions and operable independently of said lift means.

15. A tone arm assembly and actuating mechanism for phonograph record players comprising a tone arm, a needle assembly mounted upon said tone arm, a fulcrum support for said tone arm, a pivotal connection securing said tone arm to said fulcrum support for tilting about a horizontal axis, a column supporting at its upper end said fulcrum support, means for selectively tilting said tone arm about a horizontal axis and means for oscillating said column and tone arm about a vertical axis, means responsive to actuation of said last means for lifting said column in a step by step movement for adjusting the vertical position of the tone arm relative to an accumulating stack of records on a phonograph turntable, said lifting means comprising a circular cam track, a member supporting said column and movable upon said cam track, means responsive to rotation of said column in one direction for causing travel of said member over said track, manually operable means for positioning said column and tone arm at selected intermediate vertical positions and operable independently of said lift means, said manually operable means comprising a ratchet wheel connected to said member, a push rod having a pawl engaging said ratchet wheel for imparting movement thereto.

16. A tone arm assembly and actuating mechanisms for phonograph record players comprising a tone arm, a needle assembly mounted upon said tone arm, a fulcrum support for said tone arm, a pivotal connection securing said tone arm to said fulcrum support for tilting about a horizontal axis, a column supporting at its upper end said fulcrum support, means for selectively tilting said tone arm about a horizontal axis and means for oscillating said column and tone arm about a vertical axis, means responsive to actuation of said last means for lifting said column in a step by step movement for adjusting the vertical position of the tone arm relative to an accumulating stack of records on a phonograph turntable, said lifting means comprising a circular cam track, a member supporting said column and movable upon said cam track, means responsive to rotation of said column in one direction for causing travel of said member over said track, manually operable means for positioning said column and tone arm at selected intermediate vertical positions and operable independently of said lift means, said manually operable means comprising a ratchet wheel connected to said member, a push rod having a pawl engaging said ratchet wheel for imparting movement thereto, an indicator connected to said manually operable means for designating the position of vertical adjustment of the tone arm.

17. The combination of claim 15 including switch means operable upon said automatic return for deenergizing the power source of the record player.

18. A tone arm assembly for phonograph record players comprising a tone arm support including a hollow shaft, a tone arm, means pivotally connecting said tone arm at its mid-portion to said hollow shaft for upward and downward tilting about a horizontal axis, means for vertically moving said tone arm support for positioning said tone arm at selected vertical positions, means for horizontally rotating said tone arm support for effecting horizontal swinging of said tone arm, a pair of cables in said hollow shaft secured to said tone arm at opposite sides of said first mentioned means, mechanism secured to said cables for actuating the same whereby to positively actuate said tone arm into oppositely tilted position about said first mentioned means.

19. The combination of claim 18 including a housing in said tone arm support and communicating with said shaft, said mechanism including a lever plate journaled in said housing for rocking about a horizontal axis, a segmented gear on said lever plate, said cables being fastened to said lever plate on opposite sides of its horizontal axis actuating means operatively engaging said segmental gear.

20. The combination of claim 5 wherein said last means comprises a stationary circular cam having a horizontally inclined surface providing a vertical lift, a member secured to said column and riding upon said cam and effecting vertical movement of said column upon travel of said member upon said inclined surface, ratchet means operatively interposed between said column and member for causing step by step rotation of said member upon said circular cam in response to oscillatory movement of said column about its axis.

21. The combination of claim 20 including a manually operated means having an operative engagement with said member and causing selected rotation of the latter upon the circular cam independently of oscillation of said column to thereby directly position said member upon an intermediate portion of said inclined surface whereby to position said column in an intermediate position of vertical adjustment.

22. The combination of claim 5 wherein said last means comprises a stationary circular cam having a horizontally inclined surface providing a vertical lift, a member secured to said column and riding upon said cam and effecting vertical movement of said column upon travel of said member upon said inclined surface, ratchet means operatively interposed between said column and member for causing step by step rotation of said member upon said circular cam in response to oscillatory movement of said column about its axis, a guide member, the lower end of said column being journaled in said guide member and said member being journaled upon the exterior of said guide member.

References Cited in the file of this patent

UNITED STATES PATENTS

| | | |
|---|---|---|
| 1,700,397 | Birket | Jan. 29, 1929 |
| 2,175,142 | Andres | Oct. 3, 1939 |
| 2,506,692 | Thompson | May 9, 1950 |
| 2,597,113 | Lingenbrink | May 20, 1952 |
| 2,628,843 | Comstock | Feb. 17, 1953 |
| 2,661,217 | Bidinger | Dec. 1, 1953 |

FOREIGN PATENTS

| | | |
|---|---|---|
| 419,299 | Great Britain | Nov. 5, 1934 |
| 611,658 | Great Britain | Nov. 2, 1948 |
| 643,773 | Great Britain | Sept. 27, 1950 |